Sept. 9, 1969  E. E. BOWSHIER  3,465,989
CIRCULAR VTOL AIRCRAFT
Filed July 14, 1966  4 Sheets-Sheet 3

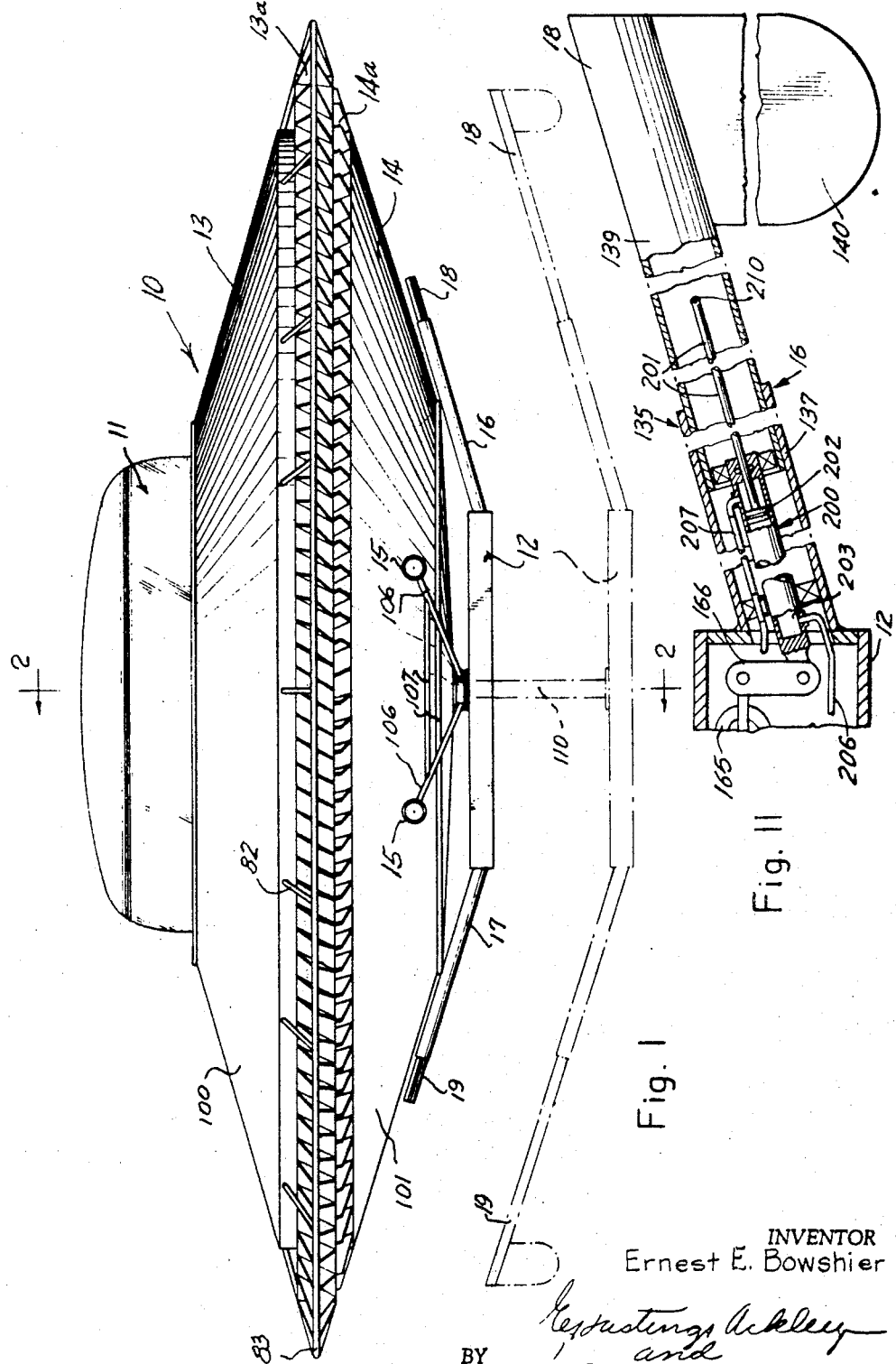

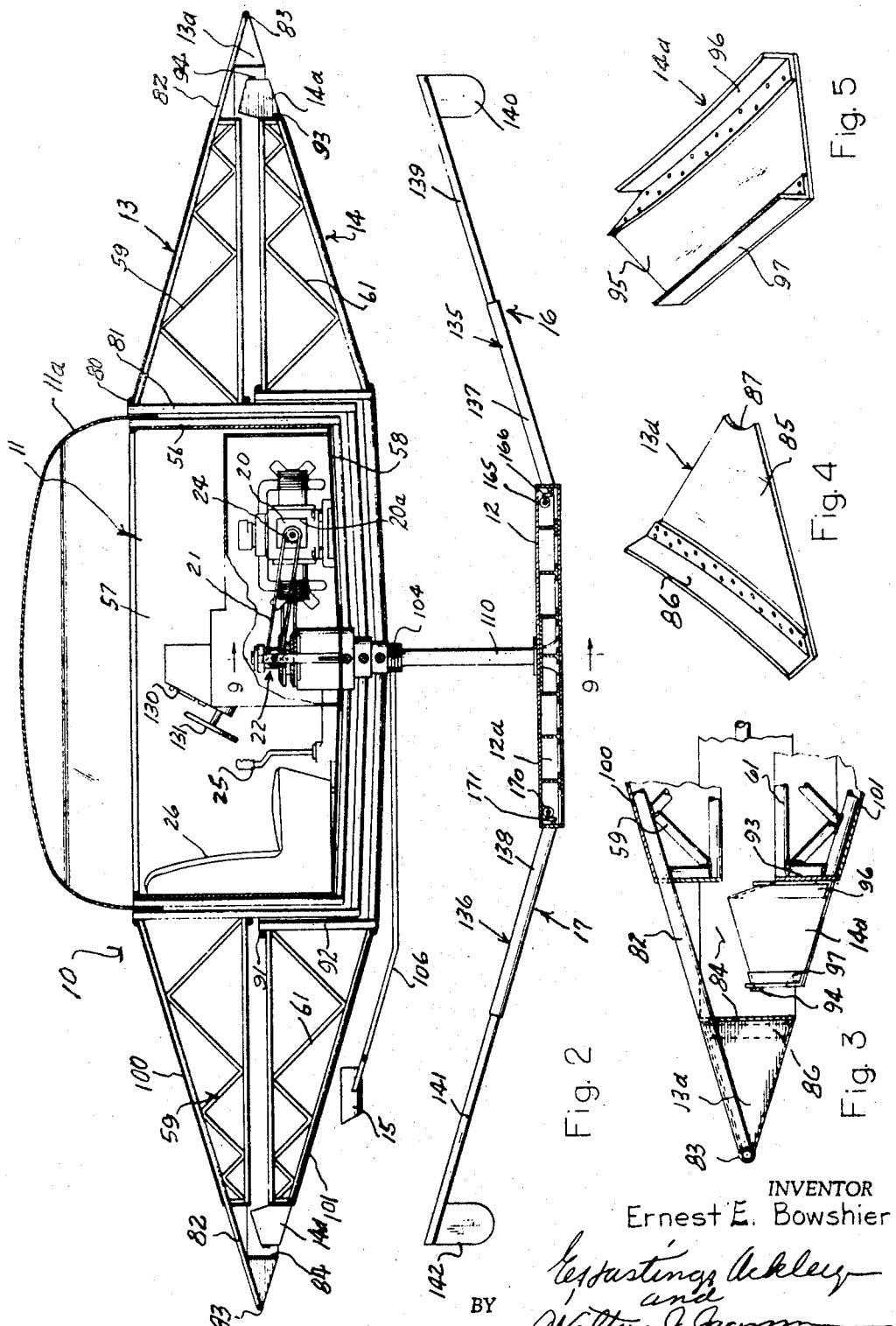

INVENTOR
Ernest E. Bowshier

BY
ATTORNEY

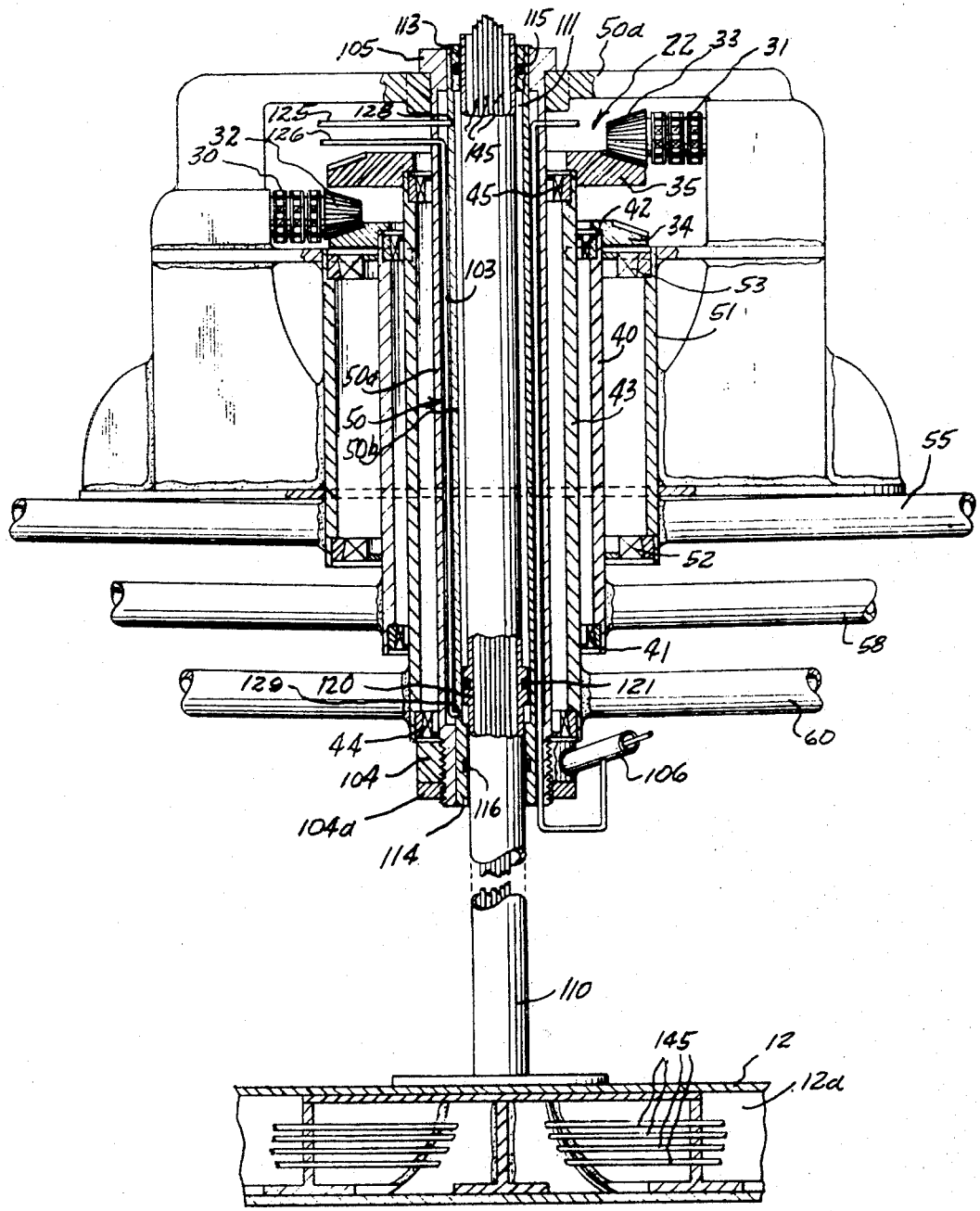
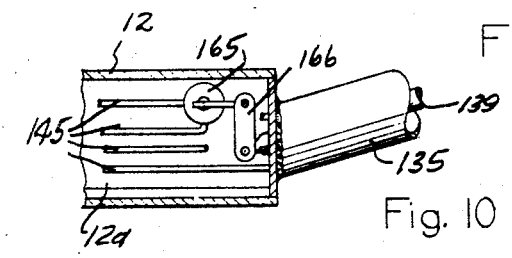
Fig. 9
Fig. 10
INVENTOR
Ernest E. Bowshier
ATTORNEY

United States Patent Office 3,465,989
Patented Sept. 9, 1969

3,465,989
CIRCULAR VTOL AIRCRAFT
Ernest E. Bowshier, Mesquite, Tex., assignor to Saucercraft, Inc., Dallas, Tex., a corporation of Texas
Filed July 14, 1966, Ser. No. 565,238
Int. Cl. B64c 29/00, 11/48
U.S. Cl. 244—23
16 Claims

ABSTRACT OF THE DISCLOSURE

A circular VTOL aircraft having a body, a central pilot and power compartment with a pair of counter-rotating impeller sections having peripheral impeller blades, the blades of one section being radially offset from the blades of the other section, and control means disposed in the downblast from the impellers to control the orientation of the aircraft about its vertical central axis, and having power means for propelling the aircraft in a direction normal to the axis of lift of the impeller sections.

---

This invention relates to new and useful improvements in aircraft.

One object of the invention is to provide a new and improved vertical take-off aircraft.

It is a particular object of the invention to provide an aircraft in which lift of the craft is created by counter-rotating blades or vanes.

A further object of the invention is to provide an improved aircraft having a pair of sets of counter-rotating lifting blades disposed peripherally of a central body section and movable with respect to a passenger and power compartment in said central body section for lifting the body section vertically.

Still another object of the invention is to provide an improved vertical take-off aircraft having a pair of sets of counter-rotating lifting means which are moved at a relatively high linear velocity with respect to each other, but are driven at a relatively low rate of rotation from a central power unit and passenger compartment.

Still another object of the invention is to provide an aircraft of the character set forth having means for controlling orientation of the passenger compartment and movement of the aircraft in a horizontal plane.

Still another important object of the invention is to provide a vertical take-off aircraft which is simple in design, does not require close construction tolerances, relies to some degree upon the gyroscopic action created by centrifugal force for stability, and which requires relatively low power for take-off and horizontal movement.

Still another object of the invention is to provide in an aircraft of the character set forth improved supporting and ground contact means which provides for mechanical control of the initial elevation of the position of the aircraft with respect to the ground to facilitate entry to the passenger compartment and power compartment.

Additional objects and advantages of the invention will be readily apparent from the reading of the following description of a device constructed in accordance with the invention, and reference to the accompanying drawings thereof, wherein:

FIGURE 1 is a side elevation of an aircraft constructed in accordance with the invention;

FIGURE 2 is a vertical cross-sectional view, having some parts in elevation, of the aircraft of FIGURE 1;

FIGURE 3 is an enlarged fragmentary sectional view of the sets of impeller vanes or blades of the aircraft;

FIGURE 4 is a further enlarged view of one of the outer blades for the aircraft;

FIGURE 5 is an enlarged view of one of the inner impeller blades for the aircraft;

FIGURE 9 is an enlarged fragmentary vertical sectional view of the central supporting structure, bearing structure and drive shafts of the aircraft;

FIGURE 10 is an enlarged fragmentary sectional view of the base and one orientation control; and FIGURE 11 is an enlarged fragmentary view partly in elevation, partly in section, illustrating the means for extending and retracting the arms carrying the rudder members.

Figure 7:
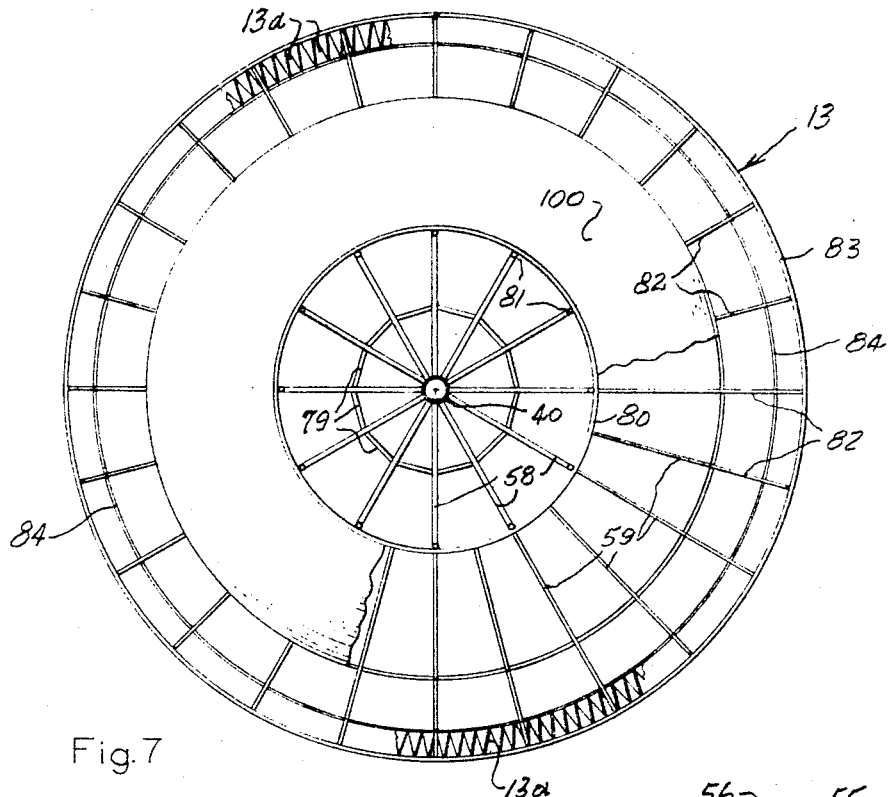
FIGURE 7 is a top plan view of the upper rotary impeller section of the aircraft, with a portion of the covering cut away to expose the frame thereof, and showing a portion of the impeller blades or vanes mounted thereon.

In the drawings, FIGURE 1, the numeral 10 designates generally a vertical take-off aircraft having a central compartment of cockpit 11, an extensible and retractable landing base 12, an upper rotary impeller section 13 having impeller blades or vanes 13a thereon, a counter-rotating lower rotary impeller section 14 having impeller blades or vanes 14a thereon, horizontal propulsion members 15, and extensible and retractable control arms 16 and 17 having control vanes 18 and 19 on the outer ends thereof for controlling the orientation of the vehicle about its vertical axis and for cooperating with the propulsion means 15 for controlling the forward or lateral direction or motion of the vehicle.

As will be more clearly seen in FIGURE 2, the cockpit 11 has therein a power unit 20, shown in the form of an internal combustion engine, having a dual chain drive connection 21 with a gear assembly 22 used for rotation of the upper rotary impeller section 13 and the lower impeller section 14. A clutch control lever 25 is mounted adjacent a passenger seat 26 and controls the driving of the gear mechanism 22 by the chains 21. The chains 21 are driven by gears 24 mounted on the opposite ends of the horizontal drive shaft of the internal combustion engine 20, and engage and mesh with sprockets 30 and 31 forming a part of the gear mechanism assembly 22, as shown in FIGURE 9. Beveled pinion gears 32 and 33 are mounted on the same shaft as the sprockets 30 and 31, respectively, and are thus driven by the chains connected with the drive shaft from the drive shaft of the motor 20. The chains thus drive the beveled ring gears 34 and 35 which mesh with the pinion gears 32 and 33, respectively, in opposite directions around the vertical axis about which they rotate. The ring gear 34 is connected as by welding or bolting or otherwise to a tubular sleeve shaft 40 which is mounted on bearings 41 and 42 so as to be rotatable about an inner sleeve shaft 43 which is also mounted on bearings 44 and 45, so as to be rotatable about a fixed or stationary supporting sleeve 50 connected at its upper end by a frame member 50a to the cockpit of the aircraft. An outer supporting sleeve 51 is also secured to the frame 55 of the cockpit of the aircraft and supports bearings 52 and 53 which rotatably support the outer rotatable sleeve shaft 40.

The sleeve 40 has connected thereto lateral radially extending tubular connector members 58 which support at their outer ends a plurality of truss members 59 forming the frame work of the upper rotary impeller section carrying the outer impeller vanes or blades 13a. Similarly, horizontal supporting tubes or connector members 60 are welded or otherwise secured to the outer surface of the sleeve 43 and extend radially outwardly and are connected at their outer ends to the truss members 61 which form the frame work of the lower rotating impeller member carrying the lower impeller vanes or blades 14a, whereby the two sets of blades are moved by rotary movement of the sleeves 40 and 43 about the vertical axis of the supporting sleeve 50.

It will thus be seen (FIG. 7) that the upper rotary impeller section 13 has a frame comprised of horizontal tubular members 58 extending radially from the central sleeve 40, intermediate their ends are braced by a series of tubular cross-braces 79, and that at the outer ends of the radially extending tubular members 58 are a plurality of truss members 59 which are secured at their inner ends to an annular support 80 connected by means of vertical members 81 with the radial tubular members 58. Each of the truss members 59 has a downwardly and outwardly inclined extension 82 of the upper tubular member at the outer end of which is secured an annular tubular supporting ring 83. An annular cylindrical supporting member 84 is secured to the tubular extension 82 inwardly of their ends and provides, with the ring 83, means for supporting the outer impeller blades or vanes 13a, as shown in FIGURE 3. The outer blades 13a, as shown in FIG. 4, each includes a curved substantially triangular impeller surface 85 having at its inner edge an arcuate angular supporting member 86 which is secured as by riveting, welding or otherwise to the annular supporting cylinder 84. An arcuate recess 87 in the outer edge of the substantially triangular impeller blade receives, and is secured as by welding, the tubular ring 83 whereby the blade is supported by the cylinder 84 and the annular tube 83. As shown in FIGURE 1, the impeller blades 13a are disposed so that they are curved slightly in a downward and rearward manner, whereby when the upper rotor 13 is turned in a counter-clockwise direction when looking downwardly upon the top of the craft the blades will impart a downward movement to the air which they engage.

Figure 8:
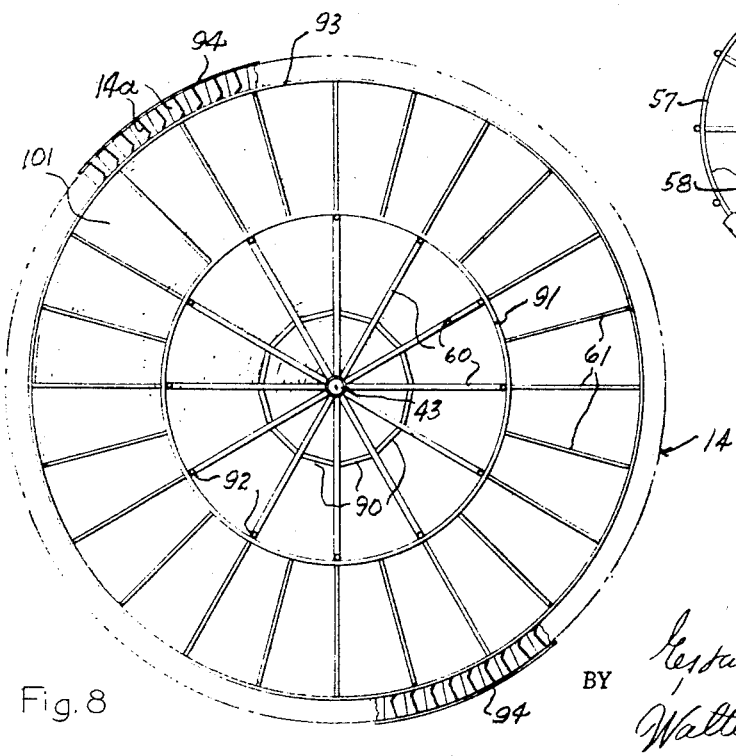
FIGURE 8 is a view similiar to FIGURE 7 showing the lower rotary impeller frame section of the aircraft, showing a portion of the impeller blades or vanes mounted thereon.

The lower rotary impeller member 14, as is shown in FIGURE 8, has a plurality of radially extending tubes 60 for strengthening and rigidifying the structure. The radially extending members 60 with the braces 90 form a rigid planar supporting means for the lower rotary element 14. The lower rotary impeller member or section 14 is also provided with a plurality of radially extending truss members 61 which are secured at their inner ends to an annular supporting ring 91 which is carried by vertical tubular supporting members 92 fixed to the outer ends of the horizontal radially extending supporting tubes 60. Each of the trusses 61 is connected at its outer end with an annular cylindrical supporting sleeve 93 which provides an inner support for the lower impeller vanes or blades 14a, and a cylindrical annular supporting ring 94 is connected to the outer edges of each of the impeller blades 14a and provides means for spacing said blades and for supporting the outer ends thereof. As is radially seen in FIGURE 1, the lower impeller blades or vanes 14a are inclined at an opposite angle or direction to the upper blades 13a, and are likewise curved downwardly and rearwardly to provide means for creating a downward blast of air as the lower member is rotated in a clockwise direction when viewed from the top of the vehicle. Each of the lower vanes or blades 14a, as shown in FIG. 5, is formed of an arcuate plate 95 provided at its inner edge with an inner angular strengthening member 96 and at its outer edge with a similar outer angular strengthening member 97. The inner member 96 is adapted to be secured as by welding, riveting or the like, to the annular supporting cylinder 93 carried at the outer ends of the trusses 61 of the lower rotary impeller section, while the outer angular supporting member 97 of the vanes is adapted to be engaged as by welding, riveting or the like, with the outer annular supporting ring 94.

As will be seen in FIGURES 1 and 2, the truss members 59 of the upper supporting rotary member are formed with their lower tubular members extending horizontally and their upper tubular members extending downwardly and outwardly to provide a downwardly and outwardly substantially frusto-conical upper surface when the frame members are covered by a suitable skin or covering 100. Similarly, but conversely, the lower truss members 61 have their upper tubular members horizontal and their lower tubular members extending outwardly and upwardly to provide an inverted frusto-conical shape when covered by the suitable metallic skin or fabric covering 101. The two rotary impeller members or sections therefore provide outwardly convergent frusto-conical surfaces merging toward the outer annular tubular ring member 83 at the outer periphery of the upper rotary member 13.

Figure 6:
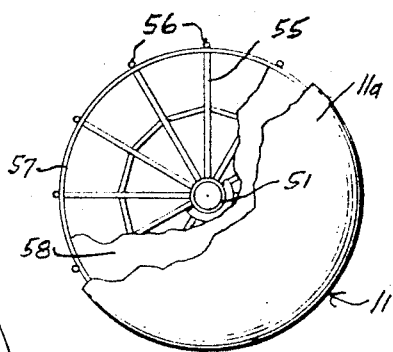
FIGURE 6 is a reduced top plan view, with some parts broken away, of the central compartment of the aircraft.

The cockpit frame structure, as shown in FIGURE 6, includes the radially extending tubular members 55 which are adjoined at their inner ends to the outer central supporting sleeve 51 of the gear assembly 22, and which have at their outer ends vertical tubular supporting members 56 which provide means for supporting the annular cylindrical cockpit enclosure 57, while the horizontal members 55 support the floor 58 of the cockpit. Suitable angularly disposed bracing members 54 are secured between adjacent radially extending tubular members 55 of the cockpit to strengthen the same. A cover 59, which may be of clear plastic or similar material, is secured to the upper ends of the upright members 56 of the cockpit and encloses the cockpit.

The inner fixed or stationary supporting sleeve 50 is formed with inner and outer tubular wall sections 50a and 50b providing a longitudinal passage 103 therebetween for fuel lines, hydraulic conduits and the like, as will be hereinafter more fully explained. The upper end of the fixed sleeve is formed with an external flange 105 and at its lower end the sleeve is provided with external screw threads onto which a collar or sleeve 104 is threaded and secured thereon by a lock nut 104a. A pair of supporting arms 106 are secured by welding or otherwise to the collar 104 and extend laterally outwardly therefrom to support the jet propulsion units 15. Lateral transverse braces 107 are secured intermediate the ends of the laterally extending divergent arms 106 to provide a rigid frame for supporting the jet engines 15 at the outer ends of the arms. The jet engines are disposed in parallel relationship and are of any well-known type to provide lateral or forward propulsion for the aircraft. It is preferred that the jets be so directed that the occupant of the central cockpit section be facing in the direction of movement produced by the jets, as shown in FIGURE 1, and the jets will thus be fixedly positioned with respect to the cabin or central cockpit portion 11 of the aircraft.

The extensible and retractable landing base and supporting member 12 is mounted on a tubular column or shaft 110 which extends upwardly into the bore 111 of the inner fixed supporting sleeve 50, as is clearly shown in FIGURE 9. Internal annular upper and lower flanges 113 and 114 having sealing rings 115 and 116 disposed therein are formed at the opposite ends of the bore of the sleeve 50, and have sliding engagement with the exterior of the column 110. The column has formed thereon an external annular piston flange section 120 having a seal ring 121 therein, which is slidable between the internal flanges in the sleeve 50. Hydraulic fluid lines 125 and 126 are disposed in the passage 103 in the tubular sleeve 50 and the line 125 communicates with a port 128 opening to the bore of the sleeve between the upper flange 113 and the piston 120 of the column, while the other line 126 communicates with a port 129 between the lower flange 114 and the piston 120 on the column 110. It will thus be seen that hydraulic fluid pressure from a suitable source driven by the engine within the cockpit of the aircraft may be directed through the line 126 and port 129 to the space between the lower flange 114 and the piston 120 on the column to move the shaft upwardly of the fixed sleeve 50 to retract the landing base. Conversely, hydraulic fluid directed through the line 125 may be conducted through the port 128 into the space between the upper flange 113 and seal ring 115 and the piston 120 to move the column downwardly in the usual manner, to provide for hydraulic extension and retraction of the landing base 12. The upper end of the tubular fixed sleeve 50 is open so that the upper end of the column 110 may extend upwardly therethrough. Suitable control valves are provided on the control board 130 in the cockpit for controlling actuation of the hydraulic system causing extension and retraction of the base.

A pair of inwardly and outwardly extensible and retractable hydraulically operated elongate arms 135 and 136 from a part of the control arms 16 and 17, respectively, and are secured as by welding to the base member 12, which it will be seen in FIGURE 2 is provided with an open braced interior 12a communicating with the bore of the inner tube or sleeve 137 of the arm 135 and the bore of the inner tube or sleeve 138 of the arm 136. The control vane 18 is formed of an extensible rod or tube 139 which is slidable in the sleeve 137 and has at its outer end a control vane or rudder member 140 which, when the arm is extended, is disposed in the downblast from the rotating impeller blades or vanes 13a and 14a. Similarly, the control vane 19 is formed of an extensible tube or rod 141 which is slidable in the sleeve 138 and has on its outer end a control vane or rudder member 142 which is moved outwardly into position to be disposed in the path of the downwardly blown blast of air from the impeller blades 13a and 14a on the opposite side of the aircraft from the rudder or orientation control vane 140. Each of the extensible tubes or rods 139 and 141 is moved outwardly by hydraulic fluid piston means, shown in FIGURE 11, with respect to the arm 139, wherein a standard type hydraulic cylinder and piston structure 200 is disposed in the sleeve 137 and has a rod 201 connected with the piston 202 in the cylinder 203 and movable by hydraulic fluid directed to the cylinder 203 through an extending fluid line 206 and a retracting fluid line 207 communicating with the bore of the cylinder. Hydraulic fluid pressure from the cockpit is directed through the hydraulic fluid lines to the cylinder to act on the piston to extend and retract the rod. The outer end of the rod is connected to the extensible tube 139 by a coupling pin 210 whereby movement of the piston causes extension and retraction of the tube. An identical structure is provided in the sleeve 136 for actuating the extensible tube 141.

Brakes 20a of usual well known type are provided in the differential housing of the machine to act on the drive shafts of the differential mechanism in the housing of the motor 20 to which the sprocket gears 24 are connected, may be used to vary the speed of rotation of the sprocket gears relative to each other and to control the rate of relative rotation of the chains 21 so that the motion imparted to the upper rotary impeller section 13 and separately imparted to the lower rotary impeller section 14 may be varied by engagement of the brakes on the drive shafts of the differential, and thus to vary the speed of relative rotation of the upper rotary impeller section with respect to the lower rotary impeller section. There is a slight difference in the speed of rotation of the upper section 13 with respect to the lower section 14, due to the difference in diameter of the sections or due to the difference in distance of the impeller blades 13a and 14a, respectively, from the center of rotation of the sections on which they are mounted. This permits creation of equal forces by the impeller blades rotated by the impeller sections to stabilize the aircraft. By further varying the speed of rotation of the impeller sections with respect to each other, the cockpit 11 may be caused to rotate about the axis of rotation of the impellers in the direction of the slower moving impeller sections, or opposite to the direction of rotation of the fastest moving impeller sections. Thus, by variation of the speeds as controlled by the brake means, the orientation of the cockpit 11 about the axis of rotation of the impeller sections may be controlled and varied to vary the direction of movement of the aircraft.

It will readily be seen that by suitably orienting the control vanes or rudders 140 and 142, the base and the cabin portion of the aircraft may be rotated with respect to the earth to orient the aircraft about the central vertical axis of the gear assembly 22. Suitable key means is provided between the shaft or column 110 and the fixed sleeve 50 to prevent rotative movement of the column with respect to the sleeve, and to cause rotative movement of the cockpit section 11 of the aircraft with the base member when such rotative movement is caused by the blast of air striking the rudders 140 and 142. Upon such rotative movement of the cabin or cockpit section 11 with respect to the vertical axis of the aircraft, the jet propulsion engines 15 will be turned and the direction of the movement of the aircraft changed accordingly.

Fluid fuel lines 150 for conducting fuel from a tank in the cabin or cockpit section 11 of the aircraft extend downwardly through the passageway 103 in the inner fixed sleeve 50 and out the lower end thereof and into the inner end of and along the elongate tubular arms 106 to the engines, whereby fuel may be pumped or otherwise supplied through the tubes to the engines for combustion therein to provide propulsion for the aircraft. Control of the fuel and ignition of the engines is also provided by suitable valves and switch means on the control board 130 of the aircraft.

The wheel 131 on the dash 130 controls actuation of both the brakes which engage the drive shafts of the differential of the motor 20 as the wheel is turned and as the wheel is tilted, the wheel controls actuation of the rudders 140 and 142 by directing hydraulic fluid through a plurality of hydraulic fluid conductor lines 145 downwardly through the bore of the shaft or column 110 and outwardly therefrom through the internal space 12a in the base member 12. One pair of conductor lines communicates in the usual manner with a hydraulic piston 160 which causes extension and retraction of the extensible tube or rod 139, and another pair of lines communicates with a piston 165 which causes actuation of a lever linkage 166 for rotating the shaft 139 about its longitudinal axis to turn the rudder 140 about the axis of the shaft. Similar pairs of lines are directed to the opposite side of the base member 12, and one set of lines communicates with a piston 170 which hydraulically extends and retracts the tube or rod 141 with respect to the cylinder or tube 138, while another set of lines conducts hydraulic fluid to a hydraulic operator cylinder 175 which actuates a lever linkage 178 to turn the extensible rod or tube 141 about its longitudinal axis to turn the rudder 142 about said axis and dispose the rudder at various positions with respect to the blast of air from the impeller blades or vanes 13a and 14a.

It is preferred that the two rudder members 140 and 142 be actuated simultaneously and in opposite direction relative to the diametrically opposed extensible and retractable arms on which they are mounted. Thus, if the rudders are pointed rearwardly relative to the position of the arms and the cockpit, as shown in FIGURE 1, but with the rudder arms 139 and 141 extended to position the rudders beneath the counter-rotating vanes or blades, it is obvious that the aircraft will be tilted downwardly in a direction in which the blades extend. Thus, if the blades are disposed so that their lower ends are pointed downwardly and rearwardly, in the direction shown in FIGURE 1, the rear of the aircraft would be tilted downwardly and the forward portion would be tilted upwardly. Conversely, if the blades were tilted so as to be pointed downwardly and forwardly relative to the cockpit and the propulsion engines 15, the forward end of the aircraft would be tilted down and the rear end upwardly. Also, by disposing the rudder members in a vertical position, as shown in FIGURE 2, (wherein the rudders, for the sake of convenience, are disposed ninety degrees out of phase with respect to the propulsion engine 15) the aircraft would be stabilized and the aircraft would not as readily rotate about the axis of rotation of the impellers. Also, it is possible, to turn the rudders in the same direction, so that one rudder extends or is pointed rearwardly and one forwardly of the diametrically opposed extensible and retractable arms, and thus cause rotation of the base 12 and the shaft or column 110 and the cockpit 11 connected therewith about the vertical axis of the gear assembly and the column. Thus, the rudders may also be utilized to stabilize and to control orientation of the cockpit or central compartment of the aircraft.

While the covers or skins 100 and 101 have been described as being applied to the outer surfaces of the trusses forming the frusto-conical portions of the rotary impeller sections 13 and 14, it will be desirable to cover the horizontally extending internal members of the truss sections 59 and 61, and to cover the interior annular vertical sections of said truss members, to reduce friction and turbulence as the impeller sections are rotated.

After the engine 20 is started, the clutch control 25 is operated to engage the chain drive 21 with the gear assembly mechanism 22 to cause rotation of the outer shaft 40 which drives the upper rotary impeller section 13 and counter-rotation of the inner rotatable shaft 41 which drives the lower rotary impeller sections 14. The impeller blades or vanes 13a and 14a will therefore cause a downdraft or blast of air, since they are on the peripheral edges of the two counter-rotating sections. The blades will move at a higher linear rate of speed than the adjacent central portion of the rotary sections so that a high rate of rotation of the shafts 40 and 41 is not required to attain a relative high linear movement of the vanes 13a and 14a. Due to the fact that the vanes are disposed outwardly near the peripheral edges of the rotating impeller members or sections, it will be readily apparent that a relatively large centrifugal force is created, which results in a substantial gyroscopic action which tends to maintain the craft in a substantially stable horizontal position. The counter-rotating upper rotary impeller section is rotated at a slightly lesser speed than is the lower rotary impeller section 14, so that the relative counter forces generated by such rotation of the two sections offset each other and the cockpit and the base of the craft will remain stationary. Also, the rudders 140 and 142 being held in a vertical position will tend to prevent, or the rudders may be adjusted to prevent, rotation of the cockpit as well.

The down-draft of the air blast created by the counter-rotating blades or vanes 13a and 14a creates a force which tends to lift the aircraft. In addition, the fan-like effect of the upper blades 13a and the lower blades 14a drawing air downwardly along the upper surface or skin 100 of the upper rotary impeller section 13 creates a further lift which tends to cause the aircraft to rise off the ground. The ground effect of the blast of air acting on the lower skin 101 of the lower rotary member and the bottom of the cockpit will also tend to initially lift the aircraft off the ground.

When the aircraft has been moved off the ground, the column or shaft 110 is moved upwardly and retracted into the sleeve 50 to move the base member upwardly adjacent the lower surface of the aircraft and to position the rudders 140 and 142 near the blast from the impeller blades or vanes.

The major portion of the center of gravity of the weight of the aircraft is below the center line of the aircraft as will be seen in FIGURE 2, and the gyroscopic effect created by rotation of the rotary impeller sections further assists in maintaining the aircraft in a stable position.

As has already been pointed out the rudders 140 and 142 may be used to control the attitude of the aircraft by shifting the rudders to tilt the craft slightly from the horizontal position. Also, the rudders may be used to orient the cabin or cockpit 11 of the aircraft, if desired. Further, the brakes applied to the differential shafts of the motor 20 driving the gears 24 may be utilized to vary the speed of rotation of the counter-rotating rotary impeller members to also alter the orientation of the cockpit about the axis of rotation of the impeller sections.

Access to the cockpit, motor and controls of the aircraft is obtained by a door (not shown) in the floor of the central body compartment. The extensible base member provides means for lifting the craft to an elevated position above the ground to permit such access.

Obivously, the size of the rotary impeller sections may be varied, and the size of the central compartment may be varied, without affecting the location of the impeller blades 13a and 14a, to provide a larger passenger compartment and power compartment than would be possible with other types of aircraft, and without affecting the operation of the aircraft in any manner.

From the foregoing, it will readily be seen that a new and improved vertical take-off aircraft has been provided, in which the lift for the craft is created by counter-rotating blades or vanes moving about a common vertical axis, and preferably driven from a common source of power. It will also be seen that the lift is created by counter-rotating lifting blades disposed peripherally of a central body section and movable with respect to the central section at a relatively high linear velocity but at a relatively low rate of rotary or angular movement about the central axis. It will also be seen that means has been provided for orienting the aircraft and means for driving the same. It will also be seen that the aircraft is economical and simple in structure, that it does not require close tolerances in construction, that the rotation of the impeller sections creates a gyroscopic action which provides for substantial stability of the aircraft movement, and that relatively low power requirements are needed for driving the aircraft in a horizontal direction.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An aircraft: a body having a central pilot and power compartment, lift means comprising a pair of counter-rotating annular impeller sections surrounding said body and mounted for rotation about a common fixed vertical axis extending axially vertically of said body, said impeller sections being formed with radially coextensive annular covered frame portions and each having a plurality of impeller blades at their outer circumferential edges beyond said covered frame portions for providing lift along the axis about which the rotary sections rotate, the blades of one section being radially offset outwardly from the common vertical axis from the blades of the other section; and power means in said body compartment for rotating said impeller sections in opposite directions.

2. In an aircraft: a central body; lift means comprising a pair of counter-rotating annular impeller sections surrounding said body laterally and mounted for rotation about a common fixed vertical axis extending axially vertically of said body, said impeller sections being formed with radially coextensive annular covered frame portions and each having a plurality of impeller blades at their outer peripheral edges beyond said covered frame portions for providing lift along the common vertical axis about which the rotary impeller sections rotate; the blades of one section being radially offset outwardly from the common vertical axis of rotation from the blades of the other section.

3. An aircraft including: a central compartment having power and control means therein; a first substantially horizontally disposed annular rotatable impeller section operatively connected with and surrounding said central compartment laterally and rotatable about a fixed vertical axis common with the vertical axis of said central compartment and having a plurality of impeller blades mounted on its outer circumference; a second substantially horizontally disposed annular rotatable impeller section operatively connected with and surrounding said central compartment laterally and rotatable about a fixed vertical axis common with the fixed vertical axis of rotation of said first impeller section and common with the vertical axis of said central compartment and having a plurality of impeller blades mounted on its outer circumferential section, said impeller sections being formed with radially coextensive annular covered frame portions disposed inwardly of the impeller blades, the blades of the first impeller section being disposed radially offset outwardly from said common axis of rotation of said impeller sections from the blades of the second impeller section; said first and second rotary impeller sections being rotatable in opposite directions by said power means to drive said impeller blades to lift said aircraft from the ground.

4. An aircraft of the character set forth in claim 3, and means separate from said impeller sections for controlling orientation and horizontal movement of said aircraft.

5. An aircraft including: a central body section providing a cockpit area, power means in said body section; control means in said section; an upper annular substantially horizontally disposed rotary impeller section surrounding said body section laterally; a lower annular substantially horizontally disposed rotary impeller section surrounding said body section laterally; means for mounting said rotary impeller sections for rotation about a common axis fixed vertically with respect to and disposed centrally of said body section; impeller blades on the outer peripheral edge portion of the upper rotatable impeller section disposed at an angle relative to the horizontal plane of said section; impeller blades on the outer peripheral edge portion of the lower rotary impeller section disposed in an angular relationship with the horizontal plane of said lower section; the impeller blades of the lower section being disposed at an angle with respect to the horizontal opposite the angle at which the impeller blades on the upper section are disposed; the impeller blades of one of said impeller sections being disposed radially outwardly from said central axis beyond the impeller blades of the other impeller section and said impeller sections being formed with radially coextensive covered frame portions disposed inwardly of the impeller blades of said other impeller section; said power means in said cockpit being operatively connected with said upper and lower rotary impeller sections for driving the same about said common fixed central axis in opposite directions to provide counter-rotating lift means for said aircraft; and control means carried by said aircraft operable to control orientation of said aircraft about said central axis of said central portion of said aircraft.

6. An aircraft of the character set forth in claim 5, and means carried by said central section of said aircraft for propelling said aircraft in a direction normal to the axis of lift.

7. In an aircraft of the character set forth in claim 6, extensible and contractable landing base means for supporting the aircraft on the ground or other surface in an elevated position to provide access to the underside of the aircraft and to the cockpit area.

8. An aircraft including: a central compartment having power and control means therein; a first substantially horizontally disposed annular rotatable impeller section operatively connected with and surrounding said central compartment laterally and rotatable about a fixed vertical axis common with the vertical axis of said central compartment and having a plurality of impeller blades mounted on its outer circumference; a second substantially horizontally disposed annular rotatable impeller section operatively connected with and surrounding said central compartment laterally and rotatable about a fixed vertical axis common with the fixed vertical axis of rotation of said first impeller section and common with the vertical axis of said central compartment and having a plurality of impeller blades mounted on its outer circumferential section, said impeller sections being formed with radially coextensive annular covered frame portions disposed inwardly of the impeller blades, the blades of the first impeller section being disposed radially offset outwardly from said common axis of rotation of said impeller sections from the blades of the second impeller section; said first and second rotary impeller sections being rotatable in opposite directions by said power means to drive said impeller blades to lift said aircraft from the ground; and means for controlling orientation and horizontal movement of said aircraft comprising extensible and contractable arms operatively connected with said central compartment and having at their outer ends rudder members movable into position to be disposed in the downblast from the impeller blades.

9. In combination with the aircraft set forth in claim 3: jet propulsion means carried by and connected with the central compartment of said aircraft separate from said impeller sections for providing force normal to the axis of rotation of the rotary impeller sections to move the aircraft in a direction normal to the direction of lift.

10. An aircraft of the character set forth in claim 1, wherein: said impeller blades at the outer edges of said impeller sections are formed of arcuate sheets having reinforcing means at their radially opposite edges for connection of said blades to said impeller sections.

11. An aircraft of the character set forth in claim 8, wherein: means is provided for extending and retracting said extensible and contractable arms; and means is provided in said central compartment of said aircraft for controlling said means for extending and retracting said arms.

12. An aircraft of the character set forth in claim 8, wherein: means is provided in said extensible and contractable arms for moving said rudder members about the longitudinal axis of said extensible and retractable arms to control orientation of the central compartment of the aircraft.

13. An aircraft of the character set forth in claim 12, wherein: means is provided in the central compartment of said aircraft for controlling actuation of said rudder members.

14. An aircraft of the character set forth in claim 1, wherein: means is operatively connected with said power means for controlling the relative counter-rotating movement of said impeller sections.

15. An aircraft of the character set forth in claim 3, wherein: braking means is provided in said central compartment cooperating with said power means for controlling relative counter-rotation of said impeller sections with respect to each other.

16. An aircraft of the character set forth in claim 3, wherein: means is provided for varying the rate of rotation of the counter-rotating impeller sections with respect to each to control the rotation of the central compartment of the aircraft.

(References on following page)

References Cited

UNITED STATES PATENTS

| | | | |
|---|---|---|---|
| 1,868,392 | 7/1932 | Leffert | 244—17.23 |
| 2,728,537 | 12/1955 | Elkins | 244—17.11 X |
| 2,730,311 | 1/1956 | Doak | 244—12 |
| 2,843,338 | 7/1958 | Streib | 244—12 |
| 2,953,320 | 9/1960 | Parry | 244—12 |

FOREIGN PATENTS 1,378,993 10/1964 France.

MILTON BUCHLER, Primary Examiner

THOMAS W. BUCKMAN, Assistant Examiner

U.S. Cl. X.R.

244—17.19